(12) United States Patent
Ravichandran et al.

(10) Patent No.: US 11,745,720 B2
(45) Date of Patent: Sep. 5, 2023

(54) METHODS AND SYSTEM FOR CONTROLLING AN ENGINE

(71) Applicant: Ford Global Technologies, LLC, Dearborn, MI (US)

(72) Inventors: Maruthi Ravichandran, Dearborn, MI (US); Akshay Bichkar, Ann Arbor, MI (US); Jason Meyer, Canton, MI (US); Rajit Johri, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/449,209

(22) Filed: Sep. 28, 2021

(65) Prior Publication Data

US 2023/0097669 A1  Mar. 30, 2023

(51) Int. Cl.
| | |
|---|---|
| *B60W 10/06* | (2006.01) |
| *B60W 10/08* | (2006.01) |
| *B60W 10/02* | (2006.01) |
| *B60W 20/40* | (2016.01) |
| *F02N 11/04* | (2006.01) |
| *F02N 11/08* | (2006.01) |

(52) U.S. Cl.
CPC ............ *B60W 10/06* (2013.01); *B60W 10/02* (2013.01); *B60W 10/08* (2013.01); *B60W 20/40* (2013.01); *F02N 11/04* (2013.01); *B60W 2510/0657* (2013.01); *B60W 2510/0676* (2013.01); *B60W 2510/083* (2013.01); *B60W 2510/10* (2013.01); *B60W 2540/10* (2013.01); *B60W 2556/10* (2020.02); *B60W 2710/021* (2013.01); *B60W 2710/0666* (2013.01); *B60W 2710/083* (2013.01); *F02N 11/0803* (2013.01); *F02N 11/0814* (2013.01); *F02N 11/0844* (2013.01)

(58) Field of Classification Search
CPC ...... B60W 10/06; B60W 10/02; B60W 10/08; B60W 20/40; B60W 2510/0657; B60W 2510/0676; B60W 2510/083; B60W 2510/10; B60W 2540/10; B60W 2556/10; B60W 2710/021; B60W 2710/0666; B60W 2710/083; B60W 20/10; B60W 10/023; B60W 10/30; F02N 11/04; F02N 11/0844; F02N 11/0814; F02N 11/0803
See application file for complete search history.

(56) References Cited

U.S. PATENT DOCUMENTS

| | | | |
|---|---|---|---|
| 10,450,979 B2 | 10/2019 | Gibson et al. | |
| 2003/0001391 A1* | 1/2003 | Kuang | B60L 50/61 290/40 C |
| 2011/0136621 A1* | 6/2011 | Nedorezov | B60W 10/184 |
| 2012/0141297 A1* | 6/2012 | Jeong | B60W 30/18018 903/930 |
| 2013/0296121 A1 | 11/2013 | Gibson et al. | |
| 2013/0297187 A1* | 11/2013 | Doering | B60W 10/02 701/104 |

(Continued)

*Primary Examiner* — Richard W Ridley
*Assistant Examiner* — Aimee Tran Nguyen
(74) *Attorney, Agent, or Firm* — David Kelley; McCoy Russell LLP

(57) ABSTRACT

Systems and methods for operating a hybrid vehicle are described. In one example, the automatic engine stopping may be inhibited so that an engine may be restarted during change of mind conditions without generating a large driveline torque disturbance. The engine stopping may be inhibited based on a inhibit engine pull-down torque threshold.

16 Claims, 5 Drawing Sheets

(56) References Cited

U.S. PATENT DOCUMENTS

| | | | | |
|---|---|---|---|---|
| 2013/0297191 | A1* | 11/2013 | Gibson | B60K 6/387 |
| | | | | 701/112 |
| 2016/0238127 | A1* | 8/2016 | Nedorezov | F16H 61/0251 |
| 2016/0339906 | A1* | 11/2016 | Nefcy | B60W 10/115 |
| 2017/0080923 | A1* | 3/2017 | Johri | B60W 20/10 |
| 2020/0080527 | A1 | 3/2020 | Khafagy et al. | |

* cited by examiner

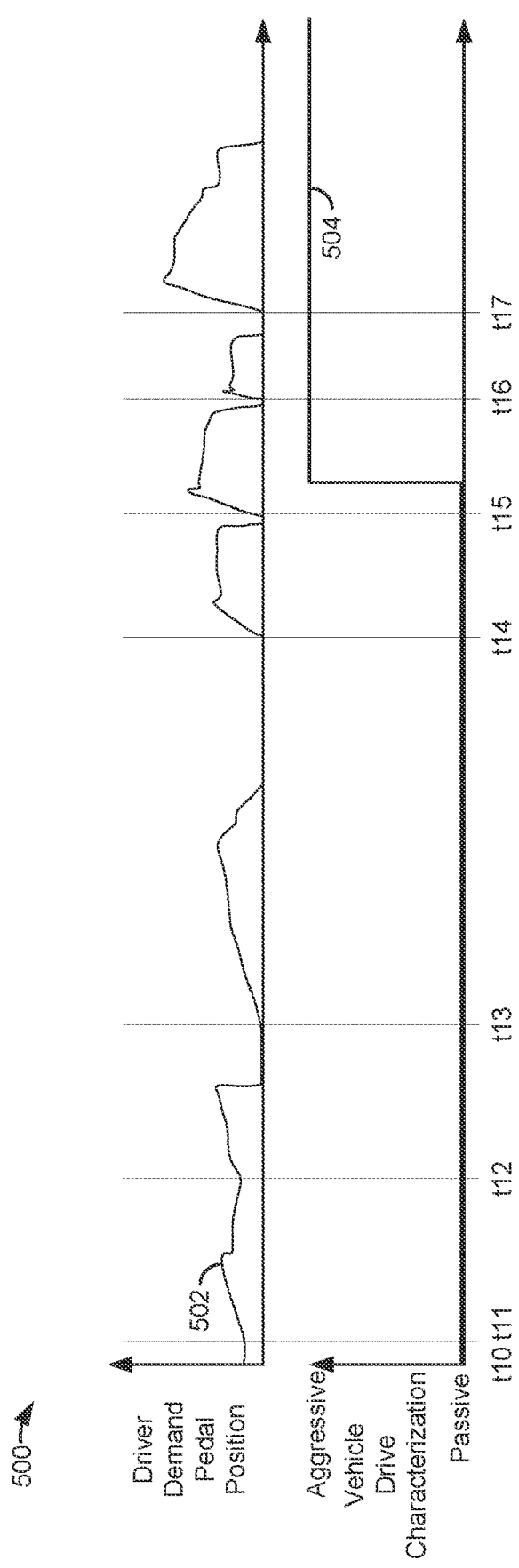

METHODS AND SYSTEM FOR CONTROLLING AN ENGINE

FIELD

The present description relates to methods and a system for controlling an engine of a hybrid vehicle.

BACKGROUND AND SUMMARY

A hybrid vehicle may automatically stop an internal combustion engine to reduce fuel consumption. The engine may be stopped when driver demand is low and an electric machine may provide the driver demand torque. The engine may be stopped when a driver demand pedal is partially or fully released. Stopping the engine may be accompanied by opening a driveline disconnect clutch so that engine speed may reach zero while a portion of the vehicle's driveline may continue to rotate at a speed that is a function of vehicle speed. Once an engine shut down has started, it takes time for the engine speed to be reduced to zero. As such, it may take several seconds for the engine shutdown to complete.

Vehicle operating conditions may change during the time period when the engine is being shut down. For example, a human driver may request additional torque or power in response to changing operating conditions after shutdown of an engine begins, which may be referred to as a change of mind condition. The change of mind condition may lead to an engine start, which may be referred to as a change of mind engine start. In particular, the request for additional powertrain torque may result in a request to restart the engine as the engine's rotational speed is being reduced to zero. The engine may be restarted via a conventional starter, but engine torque may not be available to the powertrain for several seconds if the engine is started via a conventional starter since the engine speed may need to reach powertrain speed before the engine may be coupled to the remaining powertrain. On the other hand, the engine may be restarted by closing a driveline disconnect clutch and rotating the engine using torque that is supplied by an integrated starter/generator. However, closing the driveline disconnect clutch and cranking the engine via the integrated starter/generator may reduce speed of the driveline and result in a driveline torque disturbance. Accordingly, it may be desirable to provide a way of operating the engine and the powertrain that reduces the possibility of driveline torque disturbances during the presence of changing operating conditions.

The inventors herein have recognized the above-mentioned issues and have developed a method for operating a powertrain, comprising: inhibiting automatic engine stopping based on an inhibit engine pull-down torque threshold, the inhibit engine pull-down torque threshold a function of vehicle driving history.

By inhibiting automatic engine stopping based on an inhibit engine pull-down torque threshold that is a function of vehicle driving history, it may be possible to provide the technical result of reducing torque disturbances during starting of an engine of a hybrid vehicle. In particular, engine stopping may be inhibited until an electric machine has sufficient torque capacity to start the engine and operate the vehicle with an expected performance level that may be based on vehicle driving history. Therefore, if a change of mind engine start occurs following onset of an engine is being shut down, the engine may be restarted via torque supplied by an electric machine and the electric machine may propel the vehicle with an expected level of vehicle performance.

The present description may provide several advantages. In particular, the approach may reduce a possibility of generating driveline torque disturbances during an engine restart. Further, the approach may provide improved vehicle drivability. In addition, the approach may improve operation of a driveline disconnect clutch during a change of mind engine start.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 5 shows an example vehicle drive history.

DETAILED DESCRIPTION

Figure 2:
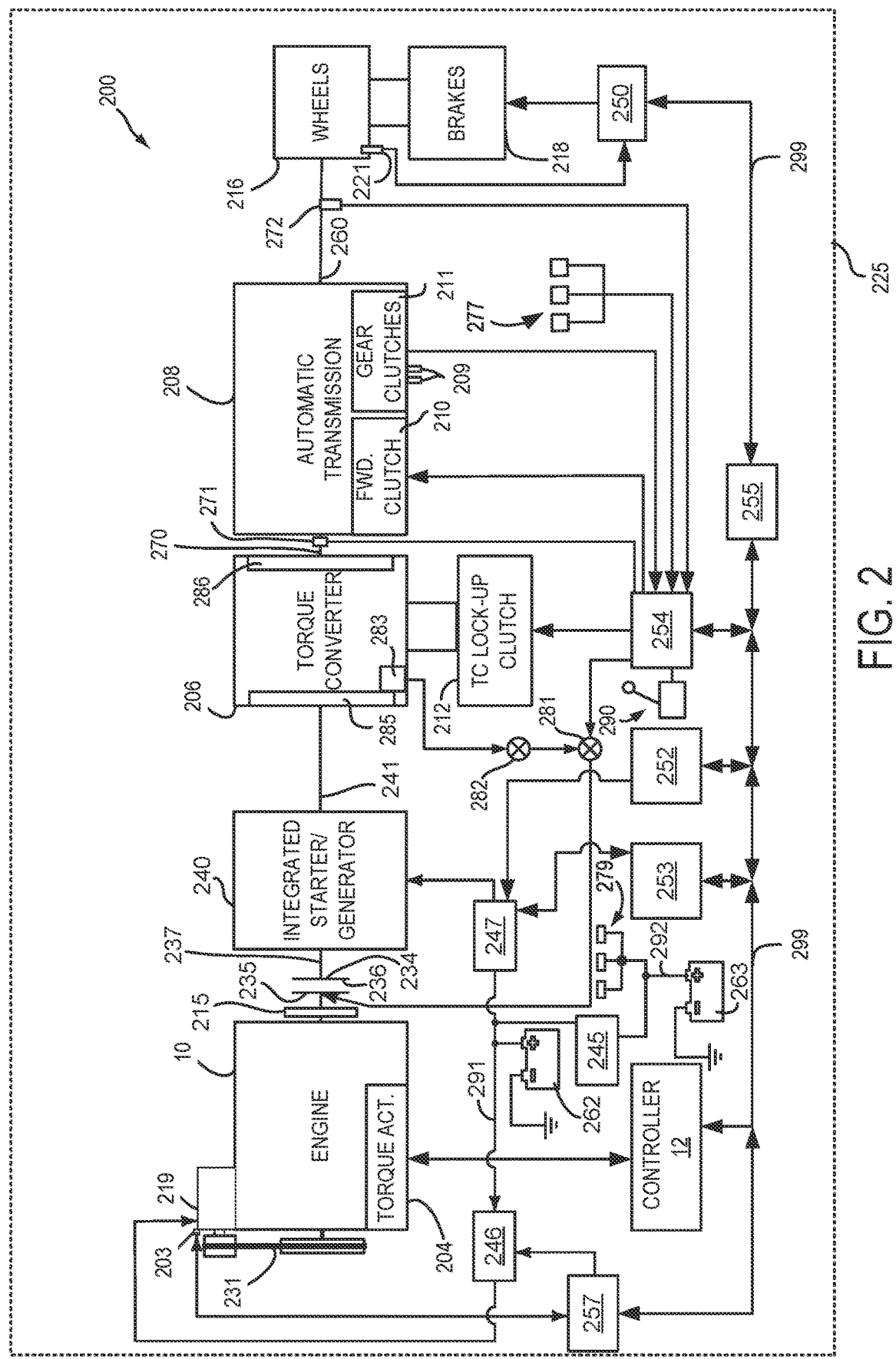
FIG. 2 is a schematic diagram of a vehicle driveline.
Figure 3:
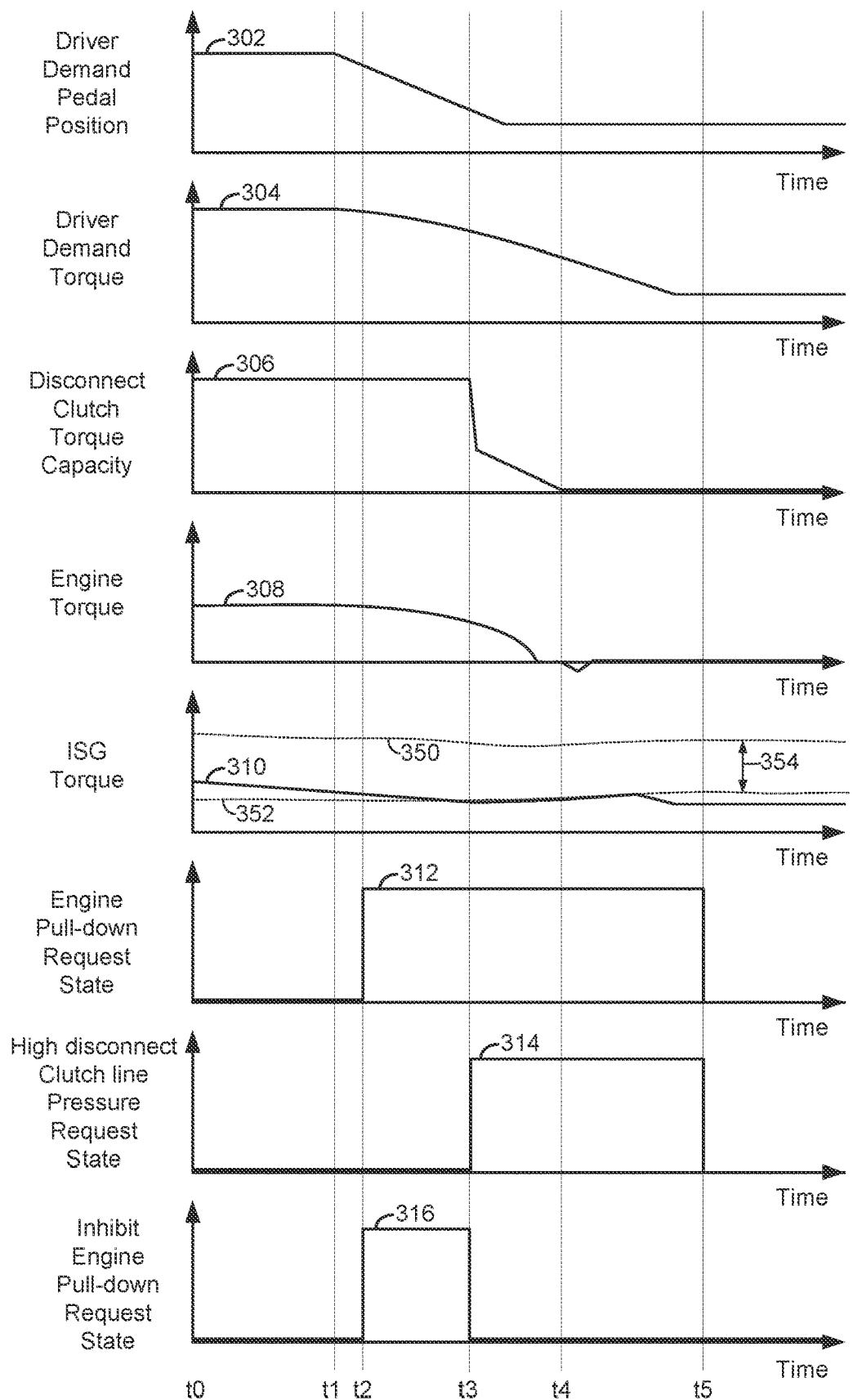
FIG. 3 shows an example engine stopping sequence where engine stopping is temporarily inhibited.

The present description is related to stopping an engine in a way that the engine may be restarted with a reduced driveline torque disturbance in response to a change of mind engine start. The engine may be started via closing a driveline disconnect clutch and applying torque to the engine via an integrated starter generator. The engine may be of the type shown in FIG. 1. The engine may be included in a driveline as shown in FIG. 2 or in another known hybrid driveline configurations (e.g., series or parallel). Engine stopping may be temporarily inhibited as shown in the sequence of FIG. 3 according to the method of FIG. 4. An example vehicle drive history during which driving style is characterized is shown in FIG. 5.

Figure 1:
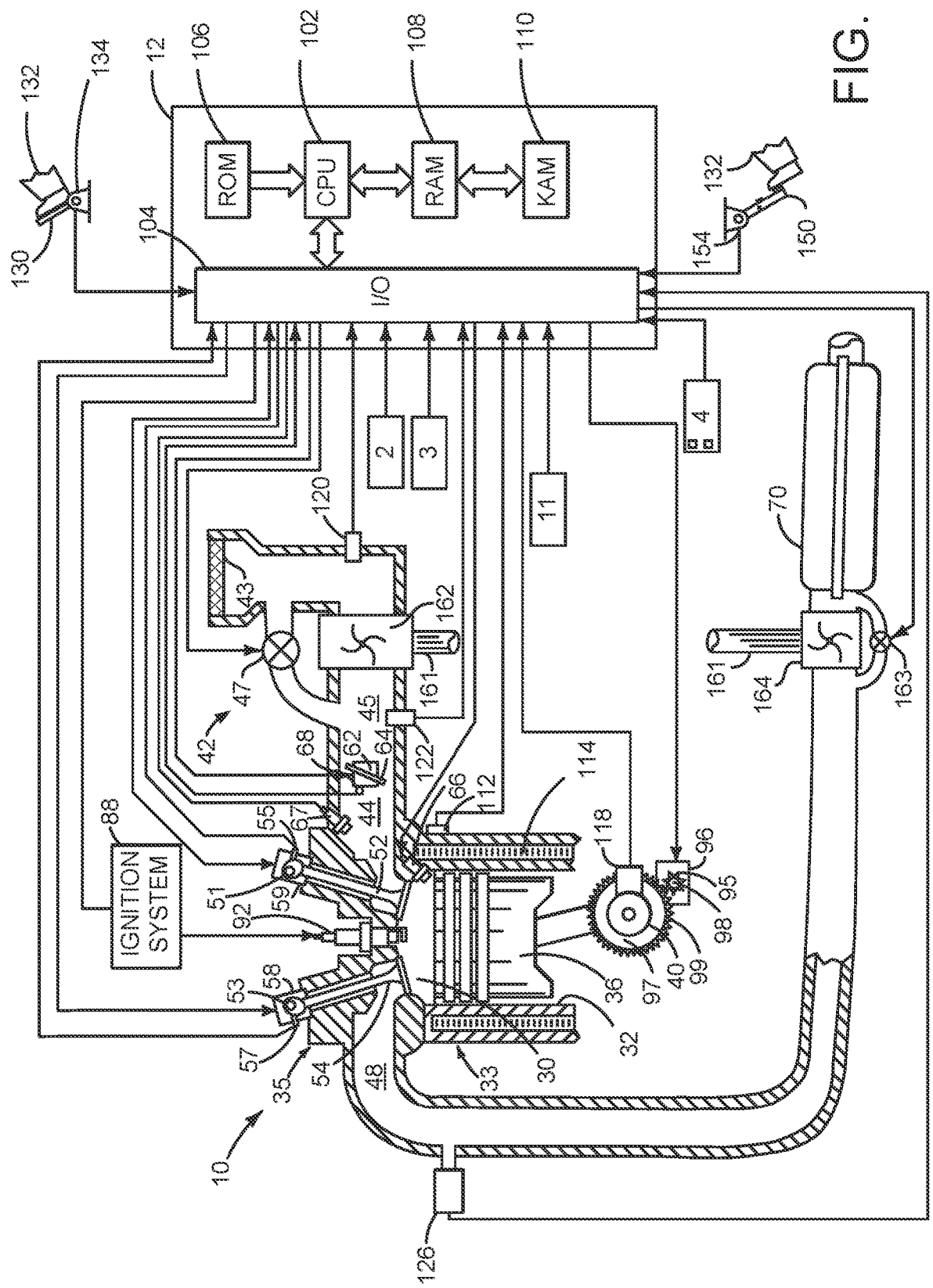
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99. Starter 96 may be referred to as a flywheel starter.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device. Controller 12 may also receive navigation and GPS data (e.g., locations of lights, signs, roads, etc.) from GPS receiver/navigation system 2. Controller 12 may interface with other vehicles to receive traffic data (e.g., locations of other vehicles, traffic flow, etc.) from connected vehicle interface 3. Controller 12 may receive proximity data from other vehicles via vehicle proximity sensing system 4. A user may select and/or request a vehicle drive mode (e.g., economy, track, highway, hill descent, etc.) via the human machine interface 11.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (BISG) 219. BISG 219 may be coupled to crankshaft 40 of engine 10 via a belt 231. Alternatively, BISG 219 may be directly coupled to crankshaft 40. BISG 219 may provide a negative torque to driveline 200 when charging higher voltage electric energy storage device 262 (e.g., a traction battery). BISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; an integrated starter/generator (ISG); a driveline disconnect clutch; and a controller including executable instructions stored in non-transitory memory that cause the controller to maintain a driveline disconnect clutch line pressure during an engine shutdown. The system includes where the engine shutdown begins when fuel ceases to be supplied to an engine cylinder. The system includes where the engine shutdown ends when engine rotational speed is zero. The system further comprises additional instructions that cause the controller to inhibit automatic engine stopping based on an inhibit engine pull-down torque threshold, the inhibit engine pull-down torque threshold a function of a vehicle drive mode. The system includes where the inhibit engine pull-down torque threshold is also a function of an active change of mind torque reserve. The system further comprises additional instructions to open the driveline disconnect clutch in response to a driver demand pedal position. The system further comprises additional instructions to close the driveline disconnect clutch in response to an increasing driver demand pedal position. The system includes where the driveline disconnect clutch line pressure is maintained during the engine shutdown via modulating a position of a valve.

Referring now to FIG. 3, an example engine stopping sequence where engine stopping is temporarily inhibited is shown. The sequence of FIG. 3 may be provided by the system of FIGS. 1 and 2 in cooperation with the method of FIG. 4. The plots of FIG. 3 are time aligned and they begin and end at the same times. The vertical lines t0-t5 represent times of interest in the sequence.

The first plot from the top of FIG. 3 is a plot of driver demand pedal position versus time. The vertical axis represents driver demand pedal position and the driver demand pedal position increases (e.g., is applied farther) in the direction of the vertical axis arrow. The horizontal axis represents time and time increases from the left side of the plot to the right side of the plot. Trace 302 represents the driver demand pedal position.

The second plot from the top of FIG. 3 is a plot of driver demand torque versus time. The vertical axis represents driver demand torque and the driver demand torque increases in the direction of the vertical axis arrow. The horizontal axis represents time and time increases from the left side of the plot to the right side of the plot. The driver demand torque may be determined via a function that is referenced by driver demand pedal position and vehicle speed. Trace 304 represents the driver demand torque.

The third plot from the top of FIG. 3 is a plot of driveline disconnect clutch torque capacity (e.g., an amount of torque that the driveline disconnect clutch may transfer) versus time. The vertical axis represents driveline disconnect clutch torque capacity and the driveline disconnect clutch torque capacity increases in the direction of the vertical axis arrow. The horizontal axis represents time and time increases from the left side of the plot to the right side of the plot. Trace 306 represents the driveline disconnect clutch torque capacity.

The fourth plot from the top of FIG. 3 is a plot of engine torque versus time. The vertical axis represents engine torque and the engine torque increases in the direction of the vertical axis arrow. The horizontal axis represents time and time increases from the left side of the plot to the right side of the plot. Trace 308 represents the engine torque.

The fifth plot from the top of FIG. 3 is a plot of integrated starter/generator (ISG) torque versus time. The vertical axis represents ISG torque and the ISG torque increases in the direction of the vertical axis arrow. The horizontal axis represents time and time increases from the left side of the plot to the right side of the plot. Trace 310 represents the ISG torque. Line 350 represents a maximum ISG output torque. The distance 354 between line 350 and line 352 represents a change of mind torque reserve.

The sixth plot from the top of FIG. 3 is a plot of an engine pull-down (e.g., engine stop rotation) request state versus time. The vertical axis represents the engine pull-down request state and the engine pull-down request is asserted when trace 312 is at a higher level near the vertical axis arrow. The engine pull-down request state is not asserted when trace 312 is at a lower level near the horizontal axis. The horizontal axis represents time and time increases from the left side of the plot to the right side of the plot. Trace 312 represents the engine pull-down request state.

The seventh plot from the top of FIG. 3 is a plot of a high driveline disconnect clutch line pressure request state versus time. The vertical axis represents the high driveline disconnect clutch line pressure request state and the high driveline disconnect clutch line pressure request is asserted when trace 314 is at a higher level near the vertical axis arrow. The high driveline disconnect clutch line pressure request state is not asserted when trace 314 is at a lower level near the horizontal axis. The horizontal axis represents time and time increases from the left side of the plot to the right side of the plot. Trace 314 represents the high driveline disconnect clutch line pressure request state.

The eighth plot from the top of FIG. 3 is a plot of an inhibit engine pull-down request state versus time. The vertical axis represents the inhibit engine pull-down request state and the inhibit engine pull-down request is asserted when trace 316 is at a higher level near the vertical axis arrow. The inhibit engine pull-down request state is not asserted when trace 316 is at a lower level near the horizontal axis. The horizontal axis represents time and time increases from the left side of the plot to the right side of the plot. Trace 316 represents the inhibit engine pull-down state.

At time t0, the driver demand pedal is applied a large amount and the driver demand torque is high. The driveline disconnect clutch torque capacity is high and the engine torque is at a medium level. The ISG torque is at a medium level and the engine pull-down request is not asserted. The high driveline disconnect clutch line pressure request is not asserted and the inhibit engine pull-down request is not asserted.

At time t1, the driver demand pedal begins to be released and the driver demand torque begins to be reduced. The driveline disconnect clutch torque capacity is high and the engine torque begins to be reduced. The ISG torque is being reduced and the engine pull-down request is not asserted. The high driveline disconnect clutch line pressure request is not asserted and the inhibit engine pull-down request is not asserted.

At time t2, the driver demand pedal is released further and the driver demand torque is reduced further. The driveline disconnect clutch torque capacity remains high and the engine torque continues to be reduced. The ISG torque continues to decrease and the engine pull-down request is now asserted. The high driveline disconnect clutch line pressure request is not asserted, but the inhibit engine pull-down request is asserted to prevent the engine from being shut down because the ISG lacks capacity to restart the engine and propel the vehicle with the requested driver demand torque.

At time t3, the driver demand pedal is released even further and the driver demand torque continues to be reduced further. The driveline disconnect clutch torque capacity begins to be reduced so that the driveline disconnect clutch may be opened. The ISG torque continues to decrease and the engine pull-down request is remains asserted. The high driveline disconnect clutch line pressure request is now asserted and the inhibit engine pull-down request is withdrawn to allow the engine to be shut down since the ISG now has capacity to restart the engine and propel the vehicle with the requested driver demand torque.

At time t3, the driver demand pedal is released even further and the driver demand torque continues to be reduced further. The driveline disconnect clutch torque capacity begins to be reduced so that the driveline disconnect clutch may be opened. The ISG torque continues to decrease and the engine pull-down request is remains asserted. The high driveline disconnect clutch line pressure request is now asserted and the inhibit engine pull-down request is withdrawn to allow the engine to be shut down since the ISG now has capacity to restart the engine and propel the vehicle with the requested driver demand torque.

At time t4, the driver demand pedal has leveled off to a lower level and the driver demand torque continues to be reduced further. The driveline disconnect clutch torque capacity is zero and the driveline disconnect clutch is open. The ISG torque is increased to provide the requested driver demand torque. The engine pull-down request is remains asserted and the high driveline disconnect clutch line pressure request remains asserted. The inhibit engine pull-down request remains withdrawn.

At time t5, the driver demand pedal position is unchanged and the driver demand torque levels off to a lower level. The driveline disconnect clutch torque capacity is zero and the engine torque is zero indicating that the engine has stopped rotating. The ISG torque is providing the driver demand torque. The high driveline disconnect clutch line pressure request is no longer asserted because the engine is stopped. The inhibit engine pull-down request remains withdrawn.

In this way, an engine pull-down request may be inhibited so that if there is a change of mind condition, the engine may be restarted and the driveline may continue to provide smooth torque output. The inhibit of engine pull-down or automatic engine stopping may be withdrawn when the ISG has sufficient torque to restart the engine and propel the vehicle according to the driver demand torque.

Figure 4:
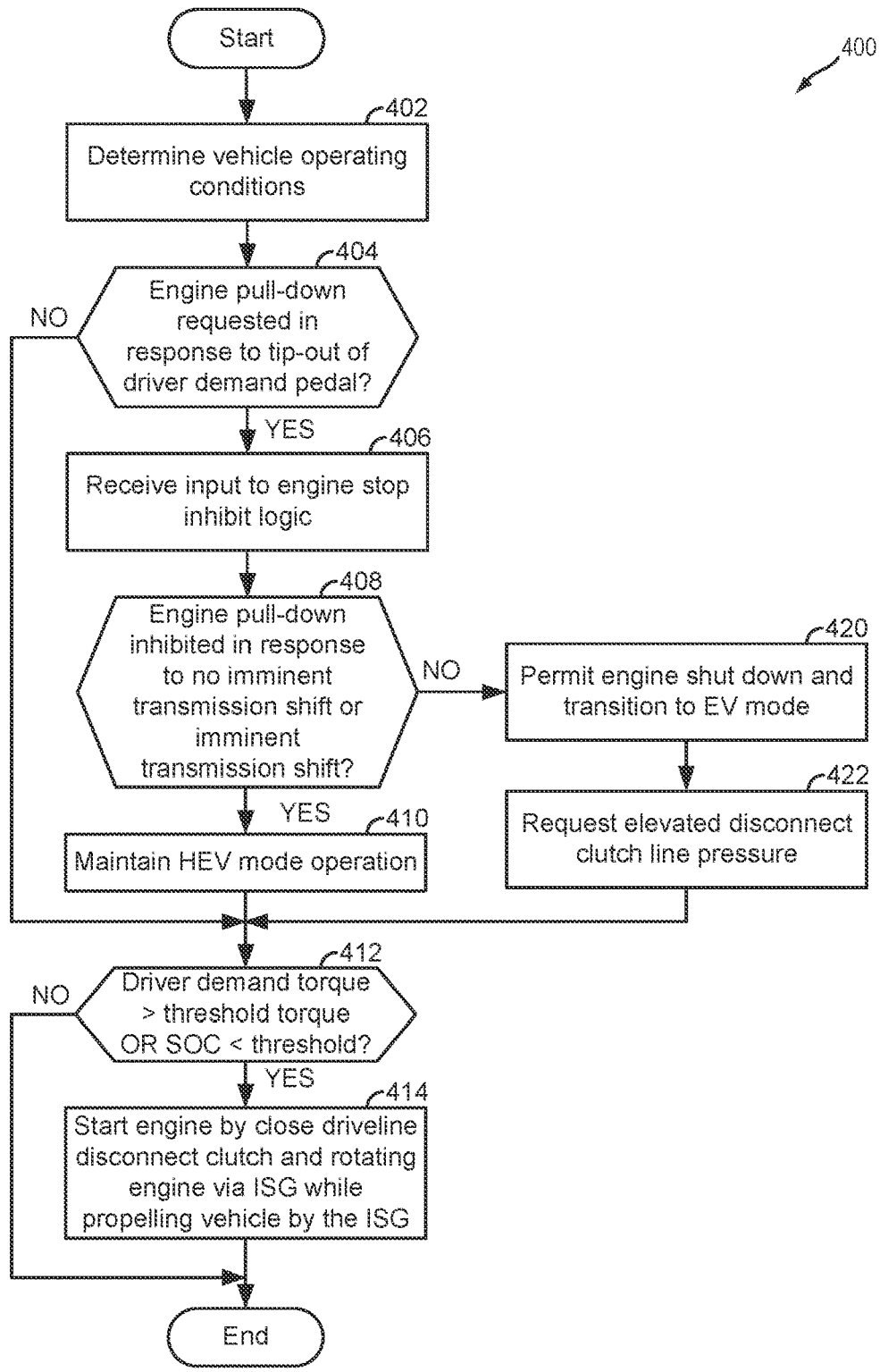
FIG. 4 shows an example method for stopping and starting an engine.

Turning now to FIG. 4, a flowchart of a method for stopping and starting engine is shown. The method of FIG. 4 may be incorporated into and may cooperate with the system of FIGS. 1-2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may be determined from the vehicle's various sensors and actuators. The vehicle operating conditions may include, but are not limited to engine speed, vehicle speed, driver demand torque, ambient air temperature, barometric pressure, torque converter impeller speed, vehicle drive mode, vehicle drive history characterization, engaged transmission gear, target transmission gear, and change of mind engine cranking reserve torque. Method 400 proceeds to 404.

At 404, method 400 judges if an engine pull-down (e.g., an automatic engine stop that is not directly requested via a vehicle occupant) is requested in response to tip-out (e.g., release or partial release of the driver demand pedal) of the driver demand pedal. In one example, an engine pull-down may be requested when the driver demand pedal release rate exceeds a threshold release rate. Further, in some examples, the engine pull-down may be requested when the driver demand pedal position changes by more than a threshold amount within a prescribed period of time. If method 400 judges to request an engine pull-down in response to a tip-out, the answer is yes and method 400 proceeds to 406. Otherwise, the answer is no and method 400 proceeds to 412.

At 406, method 400 receives inputs to logic for inhibiting automatic engine stopping (e.g., engine pull-down). The inputs may include, but are not limited to maximum ISG torque output, torque converter impeller speed for present gear, torque converter impeller speed for target gear, allocation of driver demand torque to ISG, vehicle drive mode, inhibit engine pull-down torque map (e.g., a map of ISG torque values where engine pull-down may be inhibited), vehicle drive history, present engaged transmission gear, target transmission gear, and change of mind ISG engine cranking capacity (e.g., an amount of ISG torque needed to crank the engine).

Method 400 also determines whether or not to invoke inhibiting of automatic engine pull-down or stopping. In one example, method 400 may inhibit automatic engine stopping if a transmission shift is imminent according to the following:

$$\text{Inhibit\_pulldown\_SI} = (\max\_ISG\_tor(ISTTG) - DDT\_ISG(TTG)) < (\text{inhib\_eng\_pulldown\_thres}(ACoM\_tor, DM, VDH))$$

where Inhibit_pulldown_SI is a variable that defines whether or not inhibiting of engine pull-down when a transmission shift is imminent is asserted or not asserted, max_ISG_tor is variable that represents a maximum output torque of the ISG as the present ISG speed, ISTTG is a variable that represents a torque converter impeller speed at the target transmission gear (e.g., gear to be engaged), DDT_ISG is a variable that represents the amount of driver demand torque that is allocated to the ISG, TTG is a variable that represents the target transmission gear, inhib_eng_pulldown_thres is a variable that represents an inhibit engine pull-down torque threshold, ACoM is a variable that represents a change of mind engine cranking torque or an active change of mind torque reserve, DM is a variable that represents the vehicle drive mode, and VDH is a variable that represents a vehicle drive history. Thus, max_ISG_tor is a function of ISTTG, DDT_ISG is a function of TTG, and inhib_eng_pulldown_thres is a function of ACoM, DM, and VDH. If Inhibit_pulldown_SI is asserted (e.g., (max_ISG_tor (ISTTG)–DDT_ISG (TTG))<(inhib_eng_pulldown_thres (ACoM_tor, DM, VDH))), automatic engine stopping is inhibited. If Inhibit_pulldown_SI is not asserted, automatic engine stopping is not inhibited. Inhibit_pulldown_SI is asserted when (max_ISG_tor (ISTTG)–DDT_ISG (TTG))<(inhib_eng_pulldown_thres (ACoM_tor, DM, VDH)) is true. Otherwise, Inhibit_pulldown_SI is not asserted.

In another example, method 400 may inhibit automatic engine stopping if a transmission shift is not imminent according to the following:

$$\text{Inhibit\_pulldown\_SNI} = (\max\_ISG\_tor(ISCTG) - DDT\_ISG(CTG)) < (\text{inhib\_eng\_pulldown\_thres}(ACoM\_tor, DM, VDH))$$

where Inhibit_pulldown_SNI is a variable that defines whether or not inhibiting of engine pull-down when a transmission shift is not imminent is asserted or not asserted, max_ISG_tor is as previously described, ISCTG is a variable that represents a torque converter impeller speed at the current or present transmission gear, DDT_ISG is as previously described, CTG is a variable that represents the current or present transmission gear, inhib_eng_pulldown_thres is as previously described, ACoM is as previously described, DM is as previously described, and VDH is as previously described. Thus, max_ISG_tor is a function of ISCTG, DDT_ISG is a function of CTG, and inhib_eng_pulldown_thres is a function of ACoM, DM, and VDH. If Inhibit_pulldown_SNI is asserted (e.g., (max_ISG_tor (ISCTG)–DDT_ISG (CTG))<(inhib_eng_pulldown_thres (ACoM_tor, DM, VDH))), automatic engine stopping is inhibited. If Inhibit_pulldown_SNI is not asserted, automatic engine stopping is not inhibited. Inhibit_pulldown_SNI is asserted when (max_ISG_tor (ISCTG)–DDT_ISG (CTG))<(inhib_eng_pulldown_thres (ACoM_tor, DM, VDH)) is true. Otherwise, Inhibit_pulldown_SNI is not asserted.

Vehicle drive mode may also affect engine pull-down inhibiting. In particular, one vehicle drive mode may lower the inhibit engine pull-down torque threshold, and a different vehicle drive mode may increase the inhibit engine pull-down threshold, so that inhibiting of engine pull-down may tend to occur more frequently or less frequently. For example, a vehicle operating in an economy vehicle drive mode may increase or raise the inhibit engine pull-down torque threshold so that engine pull-down inhibiting may occur less frequently. In other words, if the vehicle is in economy mode, the engine may be pulled down more frequently to conserve fuel. On the other hand, if a vehicle is operating in a track vehicle driving mode (e.g., performance oriented driving), the inhibit engine pull-down torque threshold may be decreased or lowered so that engine pull-down inhibiting may occur more frequently. In other words, if the vehicle is operating in track mode, the engine may be pulled down less frequently so that driver demand power is readily available. Vehicle drive mode may adjust the inhibit engine pull-down threshold via an offset adder or a multiplier.

One vehicle drive history may lower the inhibit engine pull-down torque threshold, and a different vehicle drive history may increase the inhibit engine pull-down threshold, so that inhibiting of engine pull-down may tend to occur more frequently or less frequently. For example, a vehicle drive history or a vehicle driver's history may be characterized as "passive" and a "passive" vehicle drive history or driver's history characterization may increase or raise the inhibit engine pull-down torque threshold so that engine pull-down inhibiting may occur less frequently. In other words, if the vehicle drive history or vehicle driver's history is characterized as "passive," the engine may be pulled down more frequently based on an expectation that the vehicle's driver may not request a significant amount of torque in a short period of time. On the other hand, if a vehicle drive history or vehicle driver's history is characterized as "aggressive," the inhibit engine pull-down torque threshold may be decreased or lowered so that engine pull-down inhibiting may occur more frequently. In other words, if the vehicle drive history or vehicle driver's history is characterized as "aggressive," the engine may be pulled down less frequently with the expectation that the vehicle's driver may request a large amount of torque in a short period of time. As such, the vehicle may be prepared for such a condition and the possibility of driveline torque disturbance may be reduced. Vehicle drive history characterization may adjust the inhibit engine pull-down threshold via an offset adder or a multiplier.

The active change of mind engine cranking torque may be a function of engine temperature and the active change of mind engine cranking torque may be greater for low engine temperatures. The active change of mind engine cranking torque may be smaller for higher engine temperatures. This allows engine pull-down inhibiting to occur less frequently at higher engine temperatures and more frequently at lower engine temperatures. In other words, if the engine cranking torque is higher for lower engine temperatures, the engine may be pulled down less frequently. On the other hand, if the active change of mind engine cranking torque is lower for higher engine temperatures, the engine may be pulled down more frequently.

Method 400 proceeds to 408 after judging engine pull-down is to be inhibited for an imminent transmission gear shift or for when a transmission gear shift is not imminent. In one example, method 400 judges if a transmission gear shift is imminent based on a transmission gear shift schedule, driver demand torque, and present vehicle speed. If the present vehicle speed is within a threshold speed of a transmission gear shift speed and driver demand torque is greater than a threshold torque, method 400 may judge that a transmission gear shift is imminent. Otherwise, method 400 may judge that a transmission gear shift is not imminent.

At 408, method 400 judges if engine pull-down is inhibited in response to no imminent transmission gear shift, or if engine pull-down is inhibited in response to an imminent transmission gear shift. If so, the answer is yes and method 400 proceeds to 410. Otherwise, the answer is no and method 400 proceeds to 420.

At 410, method 400 prevents or inhibits automatic engine stopping or pulling the engine down. Method 400 continues to operate the vehicle with the engine running (e.g., crankshaft is rotating and the engine is combusting fuel). The engine and or an electric machine may supply propulsive effort for the vehicle. Method 400 proceeds to 412.

At 412, method 400 judges if the driver demand torque is greater than a threshold torque of if battery state of charge (SOC) is less than a threshold state of charge. If so, the answer is yes and method 400 proceeds to 414. Otherwise, the answer is no and method 400 proceeds to exit.

At 414, method 400 starts the engine by closing the driveline disconnect clutch and rotating the engine with torque that is provided via the ISG. The ISG may also provide the requested driver demand torque to the vehicle's wheels so that the ISG simultaneously starts the engine and propels the vehicle. The engine may begin delivering torque to the driveline when its speed matches the speed of the ISG. Method 400 proceeds to exit.

At 420, method 400 permits the engine to be automatically stopped or pulled-down. Method 400 also transitions to electric vehicle mode (EV) via opening the driveline disconnect clutch. By opening the driveline disconnect clutch, the driveline may continue to rotate while the engine rotation is stopped. The engine may be automatically stopped by ceasing to deliver fuel to the engine. Method 400 proceeds to 422.

At 422, method 400 requests and maintains a higher level driveline disconnect clutch line pressure (e.g., the pressure in the hydraulic line that supplies a valve (281) fluid) so that the driveline disconnect clutch may be closed if there is a change of mind condition and engine restarting is requested. In one example, the line pressure is maintained above a threshold pressure that corresponds to a pressure that allows the driveline disconnect clutch to transfer sufficient torque to crank the engine at a predetermined speed. The line pressure may be provided via modulating a valve (e.g., 282). Method 400 proceeds to 412.

In this way, automatic engine stopping may be inhibited so that an ISG may have sufficient torque to start an engine and provide propulsive effort to a powertrain or driveline. If the ISG has torque capacity to crank the engine and propel the vehicle, the engine may be stopped by removing the inhibit engine stop request.

The method of FIG. 4 provides for a method for operating a powertrain, comprising: inhibiting automatic engine stopping based on an inhibit engine pull-down torque threshold, the inhibit engine pull-down torque threshold a function of vehicle drive history. The method includes where the inhibit engine pull-down torque threshold is also a function of a vehicle drive mode. The method includes where the inhibit engine pull-down torque threshold is also a function of an active change of mind torque reserve. The method includes where automatic engine stopping is inhibited in response to a maximum electric machine torque minus a driver demand torque being less than the inhibit engine pull-down torque. The method includes where automatic engine stopping is inhibited in further response to a transmission gearshift not being imminent. The method includes where automatic engine stopping is inhibited in further response to a transmission gearshift being imminent. The method includes where the vehicle driving history is characterized as aggressive or passive.

The method of FIG. 4 also provides for a method for operating a powertrain, comprising: inhibiting automatic engine stopping based on an inhibit engine pull-down torque threshold, the inhibit engine pull-down torque threshold a function of an active change of mind torque reserve. The method includes where the active change of mind torque reserve is a function of an engine cranking torque and engine temperature. The method includes where inhibiting automatic engine stopping based on the inhibit engine pull-down torque threshold includes inhibiting automatic engine stopping based on a maximum electric machine torque minus a driver demand torque being less than the inhibit engine pull-down torque threshold. The method further comprises maintaining a driveline disconnect clutch line pressure during an engine shutdown. The method includes where the driveline disconnect clutch line pressure is maintained via modulating a position of a valve.

Referring now to FIG. 5, an example vehicle driving history sequence is shown. The sequence of FIG. 5 may be generated via the system of FIGS. 1 and 2 monitoring and characterizing vehicle operation and input to the vehicle. The plots of FIG. 5 are time aligned and they begin and end at the same times. The vertical lines t10-t17 represent times of interest in the sequence.

The first plot from the top of FIG. 5 is a plot of driver demand pedal position versus time. The vertical axis represents driver demand pedal position and the driver demand pedal position increases (e.g., is applied farther) in the direction of the vertical axis arrow. The horizontal axis represents time and time increases from the left side of the plot to the right side of the plot. Trace 502 represents the driver demand pedal position.

The second plot from the top of FIG. 5 is a plot of a vehicle drive characterization state versus time. The vertical axis represents the vehicle drive characterization state and the vehicle drive characterization state indicates that the vehicle has a history of being driven aggressively (e.g., responds at a faster rate or demand a faster response) or is being driven via an aggressive driver when trace 504 is at a higher level near the vertical axis arrow. The vehicle drive characterization state indicates that the vehicle has a history of being driven passively (e.g., responds at a relatively slow rate or demands a slower response) or is being driven via a passive driver when trace 504 is at a lower level near the vertical axis arrow. The horizontal axis represents time and time increases from the left side of the plot to the right side of the plot. Trace 504 represents the vehicle drive characterization state.

At time t10, the driver demand is steady at a lower level and the vehicle drive characterization is "passive." A series of passive tip-ins (e.g., increasing applications of the driver demand pedal) are shown from time t11 to time t13. The first tip-in begins at time t11, the second tip-in begins at time t12, and the third tip-in begins at time t13. The first three tip-ins exhibit a gradual increase in the driver demand pedal position with respect to time. As such, these tip-ins exhibit a rate of change that is less than a threshold rate of change. The vehicle drive characterization remains passive during such conditions.

At time t14, a second series of tip-ins begins and these tip-ins may be characterized as "aggressive" since the rate of change of driver demand pedal position is greater than the threshold rate of change. The second series of tip-ins includes a tip-in that begins at time t14, a tip-in that begins at time t15, a tip-in that begins at time t16, and a tip-in that begins at time t17. The vehicle drive characterization remains passive until after the tip-in at time t15. Thus, even though the tip-ins begin to be aggressive at time t14, the vehicle drive history is not re-characterized as "aggressive" until after time t15 so that re-characterizing vehicle drive history may be less busy.

In one example, a vehicle drive history may be characterized as "aggressive" or "passive" after a predetermined number of "aggressive" or "passive" tip-ins have occurred. In other examples, filtering algorithms may be applied to determine when driver demand pedal position artifacts (e.g., positive slope with greater than a threshold rate of change, negative slope with greater than a threshold rate of change, etc.) are sufficient to trigger a change in state of the vehicle drive history characterization or the vehicle driver history characterization.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating a powertrain, comprising:
adjusting an inhibit engine pull-down torque threshold based on a vehicle drive history, wherein the vehicle drive history is based on a plurality of tip-ins; and then, after adjusting the inhibit engine pull-down torque, inhibiting automatic engine stopping based on the adjusted inhibit engine pull-down torque threshold.

2. The method of claim 1, where the inhibit engine pull-down torque threshold is also a function of a vehicle drive mode.

3. The method of claim 2, where the inhibit engine pull-down torque threshold is also a function of an active change of mind engine cranking torque reserve.

4. The method of claim 1, where automatic engine stopping is inhibited in response to a maximum electric machine torque minus a driver demand torque being less than the inhibit engine pull-down torque.

5. The method of claim 1, where the vehicle driving history is characterized as aggressive or passive.

6. A system, comprising:
an engine;
an integrated starter/generator (ISG);
a driveline disconnect clutch positioned between the engine and the ISG;
a torque converter; and
a controller including executable instructions stored in non-transitory memory that cause the controller to maintain a driveline disconnect clutch line pressure during an engine shutdown, and that cause the controller to inhibit automatic engine stopping based on an inhibit engine pull-down torque threshold, the inhibit engine pull-down torque threshold based on a torque reserve that is a function of an engine cranking torque and engine temperature.

7. The system of claim 6, where the engine shutdown begins when fuel ceases to be supplied to an engine cylinder.

8. The system of claim 7, where the engine shutdown ends when engine rotational speed is zero.

9. The system of claim 6, where the inhibit engine pull-down torque threshold is also a function of an active change of mind torque reserve.

10. The system of claim 7, further comprising additional instructions to open the driveline disconnect clutch in response to a driver demand pedal position.

11. The system of claim 10, further comprising additional instructions to close the driveline disconnect clutch in response to an increasing driver demand pedal position.

12. The system of claim 6, where the driveline disconnect clutch line pressure is maintained during the engine shutdown via modulating a position of a valve.

13. A method for operating a powertrain, comprising:
inhibiting automatic engine stopping based on an inhibit engine pull-down torque threshold, the inhibit engine pull-down torque threshold a function of an active change of mind torque reserve, where the active change of mind torque reserve is a function of an engine cranking torque and engine temperature.

14. The method of claim 13, where inhibiting automatic engine stopping based on the inhibit engine pull-down torque threshold includes inhibiting automatic engine stopping based on a maximum electric machine torque minus a driver demand torque being less than the inhibit engine pull-down torque threshold.

15. The method of claim 13, further comprising maintaining a driveline disconnect clutch line pressure during an engine shutdown.

16. The method of claim 15, where the driveline disconnect clutch line pressure is maintained via modulating a position of a valve.

* * * * *